(12) United States Patent
Xu et al.

(10) Patent No.: US 10,978,244 B2
(45) Date of Patent: Apr. 13, 2021

(54) WIRELESS POWER TRANSFER APPARATUS AND POWER SUPPLIES INCLUDING OVERLAPPING MAGNETIC CORES

(71) Applicant: EATON CAPITAL UNLIMITED COMPANY, Dublin (IE)

(72) Inventors: Jun Xu, Shanghai (CN); Xiaojun Wang, Shanghai (CN); Yilei Gu, Shanghai (CN)

(73) Assignee: Eaton Intelligent Power Limited

(*) Notice: Subject to any disclaimer, the term of this patent is extended or adjusted under 35 U.S.C. 154(b) by 121 days.

(21) Appl. No.: 15/969,019

(22) Filed: May 2, 2018

(65) Prior Publication Data

US 2018/0247760 A1     Aug. 30, 2018

Related U.S. Application Data

(62) Division of application No. 14/579,007, filed on Dec. 22, 2014, now Pat. No. 9,984,815.

(51) Int. Cl.
*H01F 27/28*     (2006.01)
*H01F 38/14*     (2006.01)
(Continued)

(52) U.S. Cl.
CPC ............ *H01F 38/14* (2013.01); *H01F 27/24* (2013.01); *H01F 27/2823* (2013.01);
(Continued)

(58) Field of Classification Search
None
See application file for complete search history.

(56) References Cited

U.S. PATENT DOCUMENTS

| | | | |
|---|---|---|---|
| 2,568,169 | A | 9/1951 | Raczynski |
| 3,484,727 | A | 12/1969 | Weber et al. |

(Continued)

FOREIGN PATENT DOCUMENTS

| | | | |
|---|---|---|---|
| CN | 102084442 A | 6/2011 | |
| CN | 102 360 870 A | 2/2012 | |

(Continued)

OTHER PUBLICATIONS

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.

(Continued)

*Primary Examiner* — Jared Fureman
*Assistant Examiner* — Aqeel H Bukhari
(74) *Attorney, Agent, or Firm* — Stanek Lemon Crouse & Meeks, P.A.

(57) ABSTRACT

A primary coil can be inside the recess, where the primary coil is wound around the center of the recess. A secondary magnetic core can include a protruding center portion that is configured for insertion into the center of the recess so that the protruding center portion overlaps the primary magnetic core side wall and is configured to provide separation between the primary magnetic core and the secondary magnetic core. A secondary coil can be wound around the protruding center portion of the secondary magnetic core.

13 Claims, 7 Drawing Sheets

(51) Int. Cl.
　　　*H01F 27/24*　　　(2006.01)
　　　*H01F 27/36*　　　(2006.01)
　　　*H01F 27/38*　　　(2006.01)
　　　*H02M 7/00*　　　(2006.01)
　　　*H02J 7/02*　　　(2016.01)

(52) U.S. Cl.
　　　CPC ............. *H01F 27/36* (2013.01); *H01F 27/38* (2013.01); *H02J 7/025* (2013.01); *H02M 7/003* (2013.01)

(56) References Cited

U.S. PATENT DOCUMENTS

| | | |
|---|---|---|
| 4,471,335 A | 9/1984 | Moritz et al. |
| 4,800,328 A | 1/1989 | Bolger et al. |
| 4,985,922 A | 1/1991 | Kolbert |
| 5,325,046 A | 6/1994 | Young et al. |
| 5,477,122 A | 12/1995 | Hall et al. |
| 5,923,152 A | 7/1999 | Guerrera |
| 6,060,875 A | 5/2000 | Capici et al. |
| 6,198,375 B1 | 3/2001 | Shafer |
| 6,957,351 B2 | 10/2005 | Emberty et al. |
| 6,967,553 B2 | 11/2005 | Jitaru |
| 7,411,479 B2 | 8/2008 | Baarman et al. |
| 7,495,414 B2 | 2/2009 | Hui |
| 7,554,430 B2 | 6/2009 | Mehrotra et al. |
| 7,639,110 B2 | 12/2009 | Baarman et al. |
| 8,089,766 B2 | 1/2012 | Attlesey |
| 8,138,875 B2 | 3/2012 | Baarman et al. |
| 8,380,998 B2 | 2/2013 | Azancot et al. |
| 8,531,059 B2 | 9/2013 | Ichikawa et al. |
| 8,669,678 B2 | 3/2014 | Urano |
| 8,692,639 B2 | 4/2014 | Baarman et al. |
| 8,698,350 B2 | 4/2014 | Kanno |
| 9,006,935 B2 | 4/2015 | Fukushima |
| 9,143,001 B2 * | 9/2015 | Nakayama ............. H02J 50/10 |
| 9,257,851 B2 | 2/2016 | Baarman et al. |
| 9,705,567 B2 | 7/2017 | Dean |
| 9,859,594 B2 | 1/2018 | Miller et al. |
| 2003/0201860 A1 | 10/2003 | Yang .................... H01F 27/292 336/65 |
| 2006/0049907 A1 | 3/2006 | Liu |
| 2007/0007935 A1 | 1/2007 | Johnson |
| 2008/0122543 A1 | 5/2008 | Silver |
| 2008/0204116 A1 | 8/2008 | James |
| 2010/0148723 A1 | 6/2010 | Cook |
| 2010/0314946 A1 | 12/2010 | Budde |
| 2011/0049997 A1 | 3/2011 | Urano |
| 2011/0080053 A1 | 4/2011 | Urano |
| 2011/0127845 A1 | 6/2011 | Walley |
| 2011/0127846 A1 | 6/2011 | Urano |
| 2011/0133560 A1* | 6/2011 | Yamashita ................ G06F 1/30 307/66 |
| 2011/0163542 A1 | 7/2011 | Farkas |
| 2011/0304216 A1 | 12/2011 | Baarman |
| 2012/0043825 A1 | 2/2012 | Urano |
| 2012/0049647 A1 | 3/2012 | Kim |
| 2012/0086281 A1 | 4/2012 | Kanno |
| 2012/0112719 A1 | 5/2012 | Xia et al. |
| 2012/0193993 A1 | 8/2012 | Azancot et al. |
| 2012/0200989 A1 | 8/2012 | Byrne et al. |
| 2012/0212068 A1 | 8/2012 | Urano |
| 2012/0280575 A1 | 11/2012 | Kim et al. |
| 2012/0294045 A1 | 11/2012 | Fornage et al. |
| 2012/6293118 | 11/2012 | Kim et al. |
| 2013/0033117 A1 | 2/2013 | Kim et al. |
| 2013/0147281 A1 | 6/2013 | Kamata |
| 2013/0154382 A1 | 6/2013 | Kurata |
| 2013/0187625 A1 | 7/2013 | Mao |
| 2013/0249304 A1 | 9/2013 | Keeling et al. |
| 2013/0249479 A1 | 9/2013 | Partovi |
| 2013/0300204 A1 | 11/2013 | Partovi |
| 2013/0328410 A1 | 12/2013 | Georgakopoulos |
| 2014/0021795 A1* | 1/2014 | Robertson ............. H02J 50/40 307/104 |
| 2014/0049118 A1 | 2/2014 | Karalis et al. |
| 2014/0103730 A1 | 4/2014 | Irie |
| 2014/0125142 A1 | 5/2014 | Kanno |
| 2014/0183967 A1 | 7/2014 | Ryu et al. |
| 2014/0203657 A1 | 7/2014 | Song et al. |
| 2014/0265613 A1 | 9/2014 | Jaskolski |
| 2014/0361628 A1 | 12/2014 | Huang |
| 2015/0091389 A1 | 4/2015 | Byrne et al. |
| 2015/0091522 A1 | 4/2015 | Byrne et al. |
| 2015/0188446 A1 | 7/2015 | Wu et al. |
| 2015/0280455 A1 | 10/2015 | Bosshard et al. |
| 2016/0001662 A1 | 1/2016 | Miller et al. |
| 2016/0006356 A1 | 1/2016 | Nirantare |
| 2016/0134127 A1* | 5/2016 | Yang ...................... H02J 50/10 307/104 |
| 2016/0181821 A1 | 6/2016 | Xu et al. |
| 2017/0054302 A1* | 2/2017 | Nirantare ................ B60L 53/12 |

FOREIGN PATENT DOCUMENTS

| | | | |
|---|---|---|---|
| CN | 102437750 A | 5/2012 | |
| CN | 202309183 U | 7/2012 | |
| CN | 202444333 U | 9/2012 | |
| CN | 103312048 | 9/2013 | |
| CN | 103733476 A | 4/2014 | |
| CN | 203707882 | 7/2014 | |
| CN | 104037949 | 9/2014 | |
| EP | 2 450 921 A1 | 5/2012 | |
| EP | 2 458 600 A1 | 5/2012 | |
| EP | 2450921 | 5/2012 | |
| GB | 1134208 | 2/1966 | |
| JP | 2006-271027 A | 10/2006 | |
| WO | WO 0225677 A2 | 3/2002 | |
| WO | WO 2012/046453 A1 | 4/2012 | |
| WO | WO 2013/009276 A1 | 1/2013 | |
| WO | WO 2013/111243 A1 | 8/2013 | |
| WO | WO 2013124359 A2 | 8/2013 | ............ H01F 38/14 |
| WO | WO 2014/122121 A1 | 8/2014 | |

OTHER PUBLICATIONS

International Search Report and Written Opinion Corresponding to International Application No. PCT/US2014/072667; dated Mar. 25, 2015; 9 Pages.

International Search Report and Written Opinion Corresponding to International Application No. PCT/IB2015/055004; dated Sep. 15, 2015; 9 Pages.

U.S. Appl. No. 14/323,436 entitled "Wireless Power Transfer Systems Using Load Feedback" filed Jul. 3, 2014.

U.S. Appl. No. 14/143,505 entitled "Methods, Circuits And Articles Of Manufacture For Configuring DC Output Filter Circuits" filed Dec. 30, 2013.

Braun Toothbrush Teardown, Published on May 29, 2012, EEVblog #284, Retrieved from the Internet at URL https://www.youtube.com/watch?v=JJgKfTW53uo.

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

Nair et al. "Efficiency Enhanced Magnetic Resonance Wireless Power Transfer System and High Voltage Integrated Chip Power Recovery Scheme", *IEEE CONECCT* 2014, Jan. 6-7, 2014.

International Search Report and Written Opinion Corresponding to International Application No. PCT/US2015/066406; dated Mar. 9, 2016; 11 Pages.

International Preliminary Report on Patentability Corresponding to International Application No. PCT/US2014/072667; dated Jul. 14, 2016; 7 Pages.

International Search Report and Written Opinion Corresponding to International Application No. PCT/US2016/031810; dated Jul. 20, 2016; 12 Pages.

International Search Report and Written Opinion Corresponding to International Application No. PCT/EP2015/080520; dated Jun. 30, 2016; 24 Pages.

(56) References Cited

OTHER PUBLICATIONS

Kelly et al. "Plastic-iron-powder distributed-air-gap magnetic material", 21$^{st}$ Annual IEEE Power Electronics Specialists Conference, Jun. 1990, pp. 25-34.

Pang, Y.X. et al. (2007) "The influence of the dielectric on the properties of dielectromagnetic soft magnetic composites. Investigations with silica and silica hybrid sol-gel derived model dielectric", *Journal of Magnetism and Magnetic Materials*, 310 (1), pp. 83-91.

First Office Action, Chinese Patent Application No. 2015800351710, dated Nov. 30, 2018, 9 pages.

Second Office Action, Chinese Patent Application No. 2016800280584, dated Sep. 10, 2019, 259 pages.

* cited by examiner

WIRELESS POWER TRANSFER APPARATUS AND POWER SUPPLIES INCLUDING OVERLAPPING MAGNETIC CORES

RELATED APPLICATIONS

The present application is a divisional of U.S. patent application Ser. No. 14/579,007; filed Dec. 22, 2014 with the United States Patent and Trademark Office, the disclosure of which is hereby incorporated herein by reference in its entirety.

FIELD

The present invention relates to the field of power systems, and more particularly, to wireless power transfer.

BACKGROUND

It is known to provide wireless power transfer, such as for wireless charging, by near field coupling from a transmitter coil to a receiver coil over distances ranging from about 1 cm to several meters. Efforts have been made to improve the efficiency of wireless power transfer systems by, for example, optimizing the shape of the coil used to transfer the power, adopting soft switching technology, using Litz wire, and employing new resonant tank structures. Such an approach is described, for example, in U.S. patent application Ser. No. 14/143,505; Filed Dec. 30, 2013, entitled METHODS, CIRCUITS AND ARTICLES OF MANUFACTURE FOR CONFIGURING DC OUTPUT FILTER CIRCUITS, the entire disclosure of which is incorporated herein by reference.

It is also known to provide wireless power transfer using inductive coupling from a primary side converter to a secondary side converter.

SUMMARY

Embodiments according to the present invention can provide wireless power transfer apparatuses including overlapping magnetic cores. Pursuant to these embodiments, a wireless power transfer apparatus can include a primary magnetic core that is formed to provide a recess, where the recess can have a center, a side wall, and a base that define a bottom of the recess. A primary coil can be inside the recess, where the primary coil is wound around the center of the recess. A secondary magnetic core can include a protruding center portion that is configured for insertion into the center of the recess so that the protruding center portion overlaps the primary magnetic core side wall and is configured to provide separation between the primary magnetic core and the secondary magnetic core. A secondary coil can be wound around the protruding center portion of the secondary magnetic core.

DETAILED DESCRIPTION OF EMBODIMENTS ACCORDING TO THE INVENTION

Figure 1A:
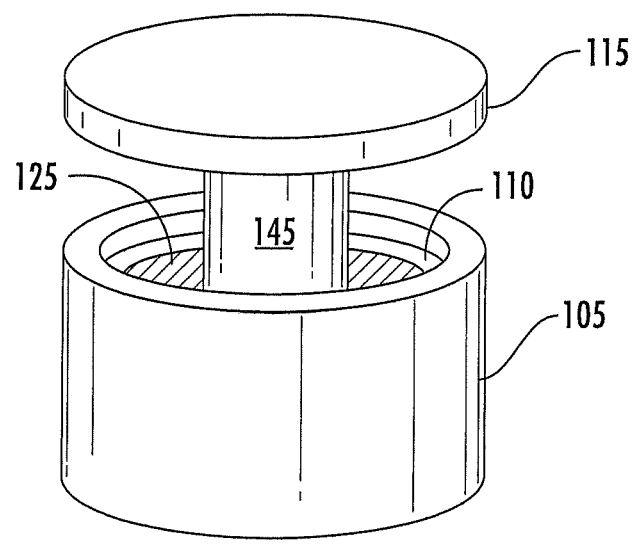
FIGS. 1A and 1B are perspective and cross-sectional views, respectively, of a primary magnetic core/coil positioned for wireless power transfer to a secondary magnetic core/coil in some embodiments according to the invention.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, primary, second, secondary etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that the terms "primary" and "secondary" are used herein to distinguish the elements from one another and not necessarily for the purpose of assigning functional or hierarchical features to those elements. Accordingly, the primary elements may be termed as the secondary elements and vice versa.

As described herein, in some embodiments according to the invention, inductive wireless power transfer can be provided by a primary magnetic core that is shaped to provide a recess in which the primary coil is wound. A secondary magnetic core can be shaped to have a center protruding portion around which a secondary coil is wound. Inductive wireless power transfer can be provided by moving the protruding portion of the secondary magnetic core/coil into the recess of the primary magnetic core/coil. Insertion of the protruding portion into the recess can increase overlap between the primary core and the secondary coil which may generate additional magnetic flux coupling between the primary and secondary thereby allowing greater efficiency in wireless power transfer.

In some embodiments according to the invention, when the secondary magnetic core/coil is inserted into the recess, the primary magnetic core/coil remains separated from the secondary magnetic core/coil by, for example an air gap. In some embodiments according to the invention, the primary magnetic core/coil and/or the secondary magnetic core/coil can be in a respective enclosure which can also provide the separation of the primary and secondary despite contact being made to the enclosure. In some embodiments according to the invention, the enclosures can be a high permeability material or otherwise infused with a high permeability material.

In some embodiments according to the invention, the primary magnetic core/coil can be enclosed in a wireless power transfer transmitter portion whereas the secondary magnetic core/coil can be enclosed in a wireless power transfer receiver portion. The receiver portion can be housed in, for example, an electrical equipment rack (such as a server rack) whereas the wireless power transfer transmitter portion can be positioned outside the electrical equipment rack (such as under the floor of the server room). In operation, the server rack including the wireless power transfer receiver portion can be positioned over the wireless power transfer transmitter portion in the floor and then lowered toward the wireless power transfer transmitter portion to maintain the proper separation distance therebetween so that the targeted wireless power transfer efficiency can be maintained. In still further embodiments according to the invention, a plurality of wireless power receiver portions can be combined where each can provide power to different dc power distribution busses in the electrical equipment rack or where all of the wireless power receiver portions outputs are combined to provide for higher voltage output.

Figure 1B:
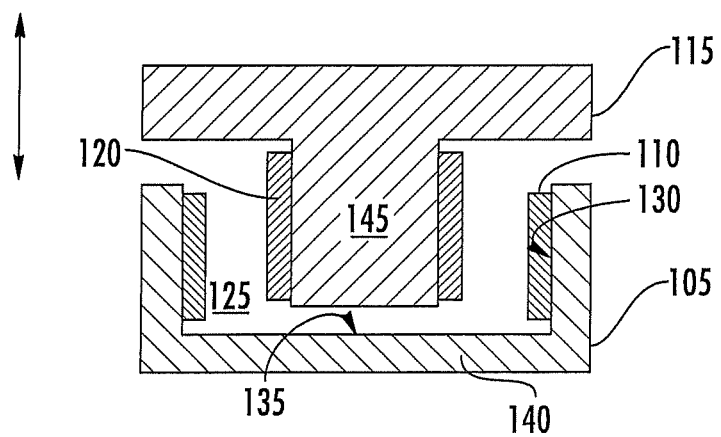

FIGS. 1A and 1B are perspective and cross-sectional views of a wireless power transfer system 100 in some embodiments according to the invention. According to FIGS. 1A and 1B, a primary magnetic core 105 is shaped to provide a recess 125 that is defined by a side wall of the recess 130 and a base 140 having a center portion 135. A primary coil 110 is wound inside the recess 125 around the center 135 of the recess 125. Although FIGS. 1A and 1B show the primary coil 110 being positioned in a particular location on the side wall 130 of the recess 125, it will be understood that the position is for illustrative purposes only and can be modified to achieve a particular efficiency or mechanical arrangement as desired for a specific application in some embodiments according to the invention.

As further shown in FIGS. 1A and 1B, a secondary magnetic core 115 includes a protruding center portion 120 around which a secondary coil 120 is wound. This protruding center portion 120 of the secondary magnetic core 115 is configured for insertion into the recess 125 opposite the center portion 135. It will be also understood that the components shown in the wireless power transfer apparatus 100 are configured such that when the protruding center portion 120 of the secondary magnetic core 115 is fully inserted into the recess 125, all portions of the secondary magnetic core/coil remain separated from all portions of the primary magnetic core/coil.

Accordingly, when the protruding portion 120 is inserted into the recess 125 for wireless power transfer, the protruding center portion 120 at least partially overlaps an uppermost portion of the side wall 130 of the primary magnetic core 105. It will be understood that the primary and secondary can remain separated from one another by the inclusion of separator structures 150 shown on the secondary magnetic core 115 and on the primary magnetic core 105 near the center portion 135. Other arrangements of separator structures can also be used to maintain that the primary and secondary remain separated during wireless power transfer.

Figure 2:
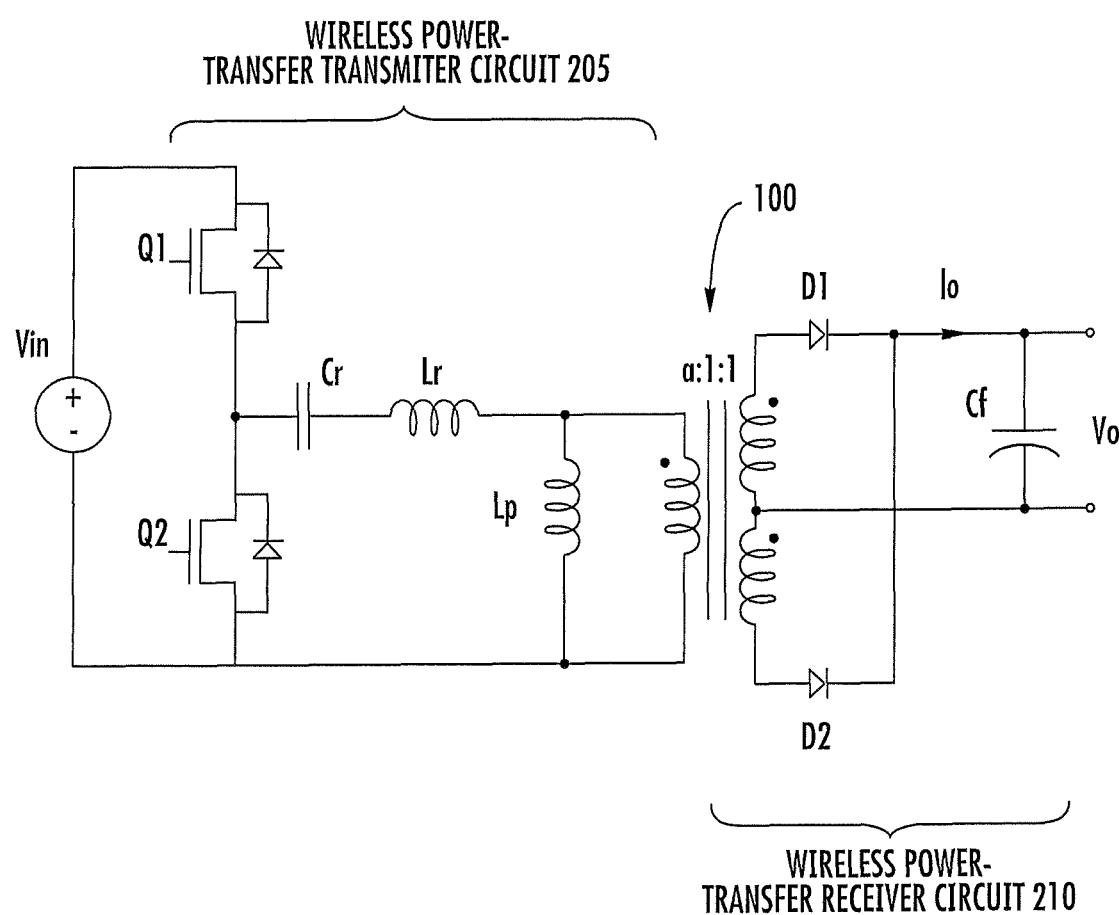
FIG. 2 is a schematic diagram of a wireless power transfer circuit including a wireless power transfer transmitter circuit portion and a wireless power transfer receiver circuit portion in some embodiments according to the invention.

FIG. 2 is a schematic diagram of a wireless power transfer circuit 200 including the wireless power transfer apparatus 100 in some embodiments according to the invention. According to FIG. 2, the wireless power transfer circuit 200 includes a wireless power transfer transmitter circuit 205 which is electrically coupled to the primary magnetic coil 110 of the wireless power transfer apparatus 100 in some embodiments according to the invention.

As further shown in FIG. 2, the wireless power transfer circuit 200 includes a wireless power transfer receiver circuit 210 that is electrically coupled to the secondary coil 120 in some embodiments according to the invention. As shown in FIG. 2, the wireless power transfer transmitter circuit 205 includes a resonant circuit whereas the wireless power transfer receiver circuit 210 does not, in some embodiments according to the invention. In operation, the wireless power transfer circuit 200 can transfer power between the wireless power transfer transmitter circuit 205 and the wireless power transfer receiver circuit 210 when the primary and secondary of the wireless power transfer apparatus 100 are within proximity of one another. For example, in some embodiments according to the invention, the primary and secondary portions of the wireless power transfer apparatus 100 may be separated by about 1 mm to about 5 mm.

It will be understood that the components of the wireless power transfer circuit 200 shown in FIG. 2 can be configured to provide general operating parameters such that the power rating sustained by the circuit 200 is about 500 watts given an input voltage of about 480 volts ac to provide an output voltage of about 12 volts dc when the separation between the primary and secondary is in the range described above. Accordingly, in operation the wireless power transfer circuit 200 can provide wireless power transfer using the wireless power transfer apparatus 100 in the range of greater than 95% efficiency.

Figure 3:
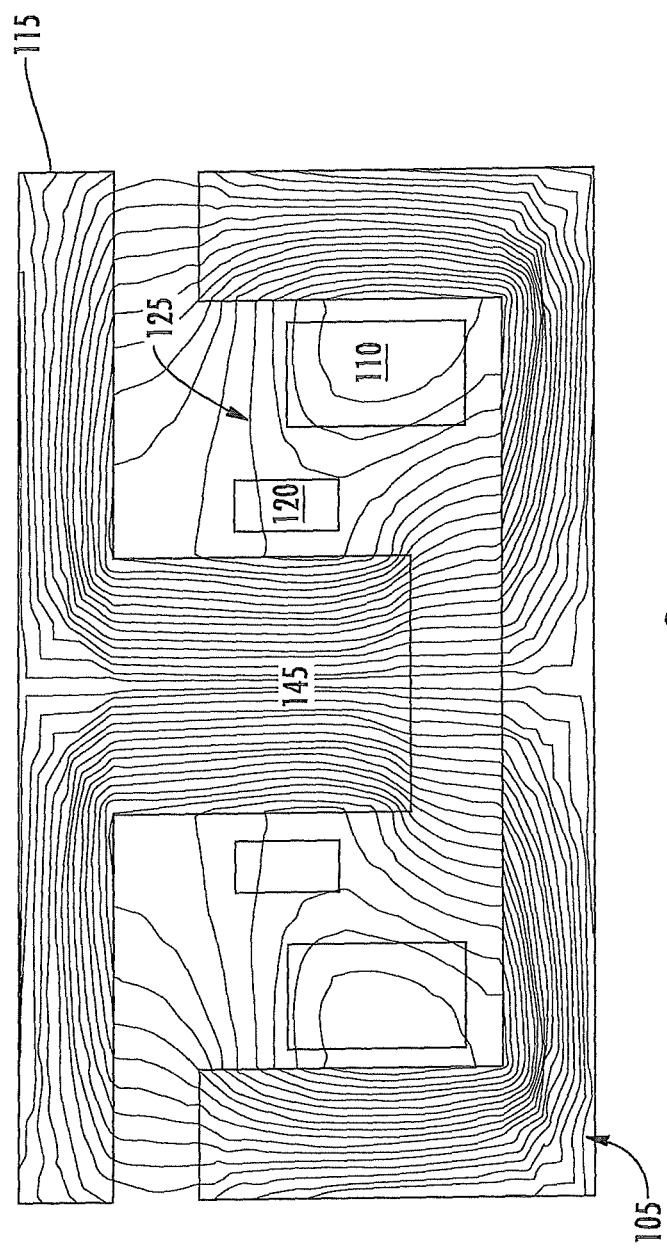
FIG. 3 is an illustration of simulation results showing magnetic flux lines generated during simulated wireless power transfer between the primary magnetic core/coil and secondary magnetic core/coil in some embodiments according to the invention.

FIG. 3 is an illustration of a simulation of magnetic flux transfer between the primary and the secondary in some embodiments according to the invention. According to FIG. 3, when the secondary magnetic core 115 including the protruding portion 145 is inserted into the recess 125 and in close proximity to the primary magnetic core 105 at a separation of about 1 mm to about 5 mm, additional magnetic flux transfer can occur from, for example, the uppermost portions of the primary magnetic core side wall 130 through the secondary coil 120 on the protruding portion 145 due to the additional overlap between the secondary coil 120 and the side walls of the primary magnetic core 105 in some embodiments according to the invention.

Figure 4:
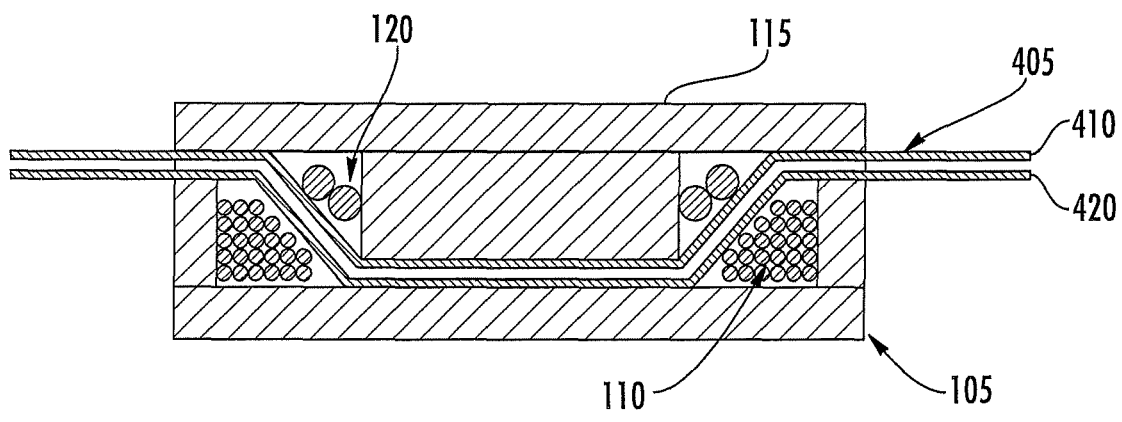
FIG. 4 is a cross-sectional illustration showing the primary magnetic core/coil and the secondary magnetic core/coil with respective separator structures therebetween in some embodiments according to the invention.

FIG. 4 is a cross-sectional view of the primary and secondary separated by first and second separator structures 410/420 in some embodiments according to the invention. The separator structures 410/420 may be, for example, portions of respective enclosures that house the primary and secondary portions along with associated transmitter and receiver circuitry. According to FIG. 4, the primary magnetic core 105 and the primary coil 110 are both enclosed by an enclosure 420 which generally follows the profile defined by the positioning of the primary coil 110 within the recess 125 of the primary magnetic core 105.

As further shown in FIG. 4, the secondary magnetic core 115 and secondary coil 120 are also enclosed by a separator structure 410 which conforms to the profile provided by the separator structure 420 to allow insertion of the secondary magnetic core 115/coil 120 into the recess 125 to allow overlap of the side walls 130 with the secondary coil 120 while also maintaining proper separation distance between the primary and secondary via the enclosures 410 and 420. In some embodiments according to the invention, the enclosures 410 and 420 can be made of a high permeability material. In still other embodiments according to the invention, the enclosures 410 and 420 can be infused with a high permeability material such as high permeability particles.

Figure 5:
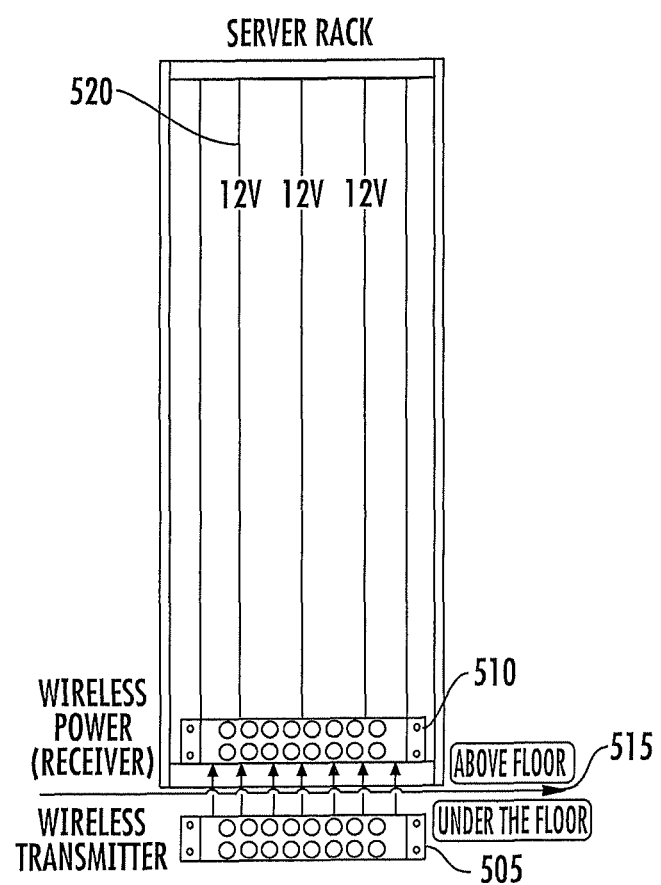
FIG. 5 is a schematic representation of an electrical equipment rack configured to house a wireless power transfer receiving apparatus for positioning over a wireless power transfer transmitter apparatus located outside the electrical equipment rack in some embodiments according to the invention.

FIG. 5 is a illustration of an electrical equipment rack 500 configured to allow the vertical mounting of electrical components therein as well as a wireless power receiver portion of the apparatus in a lowermost position of the rack in some embodiments according to the invention. According to FIG. 5, a wireless power receiver assembly 510, as part of the wireless power transfer apparatus, can be mounted at the lowest portion of the electrical equipment rack 500. It will be understood that the wireless power receiver portion 510 of the apparatus can include both the secondary magnetic core/coil as well as the wireless power transfer receiver circuit 210 shown in FIG. 2 in some embodiments according to the invention.

It will be further understood that additional components may be provided in the wireless power receiver portion 510 of the apparatus to provide, for example, separate power distribution onto separate dc power busses 520. For example, in some embodiments according to the invention, dc power can be separately provided on three separate busses 520 so that when an electrical component, such as a server, is inserted into the rack 500, power is provided to the server from the wireless power receiver portion 510.

It will be understood that in some embodiments according to the invention, the wireless power receiver portion 510 of the apparatus can be configured for coupling to legacy style power cabling in an electrical equipment rack. The legacy style power cabling can be used to distribute the power from the wireless power receiver portion 510 to, for example, servers in the rack.

All of the components of the wireless power receiver portion 510 of the apparatus can be included in a power supply that is configured to mount in the electrical equipment rack 500. For example, in some embodiments according to the invention, the power supply can be included in a power distribution unit of a server that is housed in the rack 500. The power supply can therefore include the secondary magnetic core and coil in the wireless power transfer apparatus 100 shown in FIG. 1 and the wireless power transfer receiver circuit 210 shown in FIG. 2.

As further shown in FIG. 5, a wireless power transmitter portion 505 can be located directly beneath the wireless power receiver portion 510 under the floor 515 (such as the floor in a data center when the electrical equipment rack 500 is a server rack). It will be understood that the wireless power transmitter portion 505 can include the primary magnetic core/coil portion of the apparatus 100 as well as the wireless power transfer transmitter circuit 205 shown in FIG. 2 in some embodiments according to the invention. In operation, the electrical equipment rack 500 can be positioned directly over the wireless power transmitter portion 505 under the floor 515 whereupon the wireless power receiver portion 510 can be lowered relative to the wireless power transmitter portion 505 to within the specified separation distance (such as about 1 mm to about 5 mm) so that wireless power transfer may be provided efficiently.

In some embodiments according to the invention, the electrical equipment rack 500 is lowered toward the floor 515 to provide the proper separation. In some embodiments according to the invention, the wireless power receiver portion 510 is lowered toward the floor 515 to provide the proper separation. In still other embodiments according to the invention, the wireless power transmitter portion 505 is raised toward the bottom of the rack to provide the proper separation for wireless power transfer.

FIGS. 6A-6D are schematic representations of a plurality of wireless power transfer apparatuses 100 configured for movement toward one another in some embodiments according to the invention. According to FIG. 6A-6C, the wireless power transmitter portion 605 and the wireless power receiver portion 610 are separated from one another by an amount that exceeds the separation specified for efficient wireless power transfer in some embodiments according to the invention. As further shown in FIGS. 6A and 6B, an enclosure 620 for the wireless transmitter portion 605 can be contoured into a series of recesses arranged in a grid. Still further, the enclosure 615 of the wireless power receiver portion 610 is formed into a plurality of protruding portions 615 which follow the contours provided by the plurality of recesses 620 in some embodiments according to the invention.

For operation of the wireless power transfer apparatus 100, the wireless power transmitter portion 605 and the wireless power receiver portion 610 are moved relative to one another so that the protruding portions 615 protrude into the recesses 620 in unison with one another. According to FIG. 6D, the plurality of protruding portions of the secondary magnetic core/coil can be inserted into the recess provided by the plurality of primary magnetic core/coil in unison with one another.

Figure 6A:
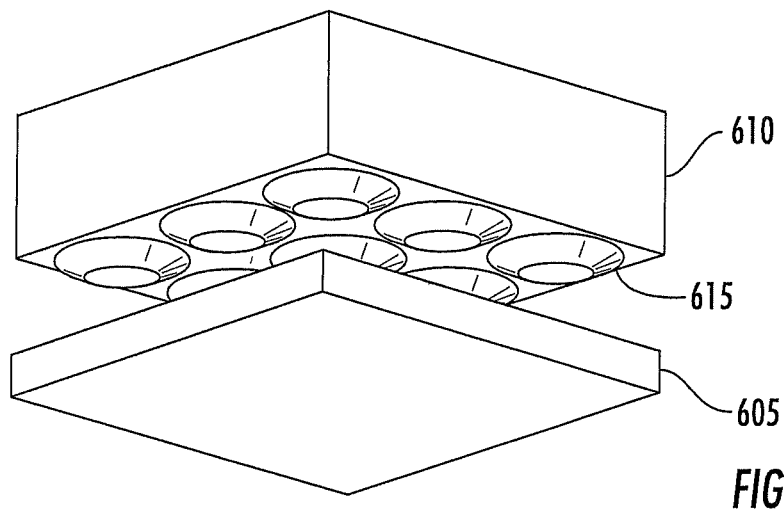
FIG. 6A-6D are representations of a plurality of wireless power transfer transmitter apparatuses and a corresponding plurality of wireless power transfer receiver apparatuses configured to move relative to one another in some embodiments according to the invention.
Figure 6B:
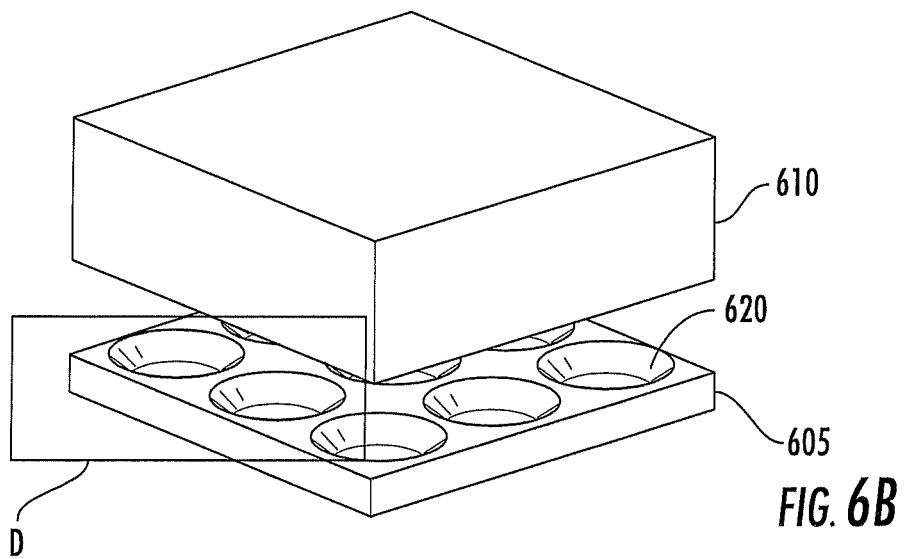
Figure 6C:
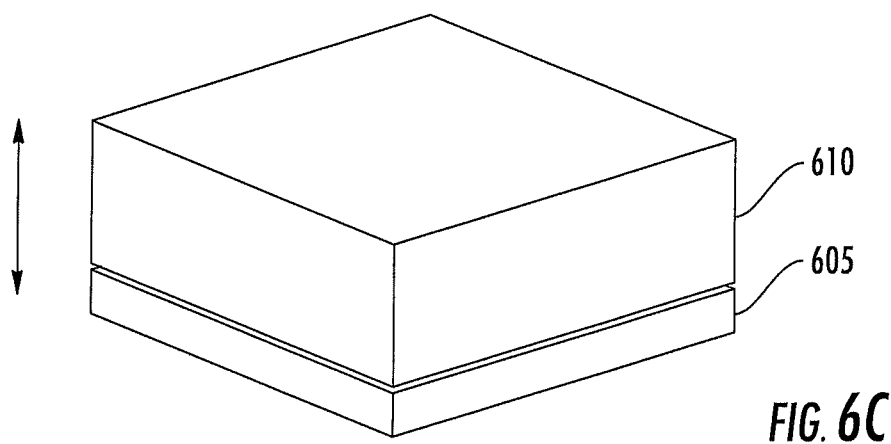
Figure 6D:
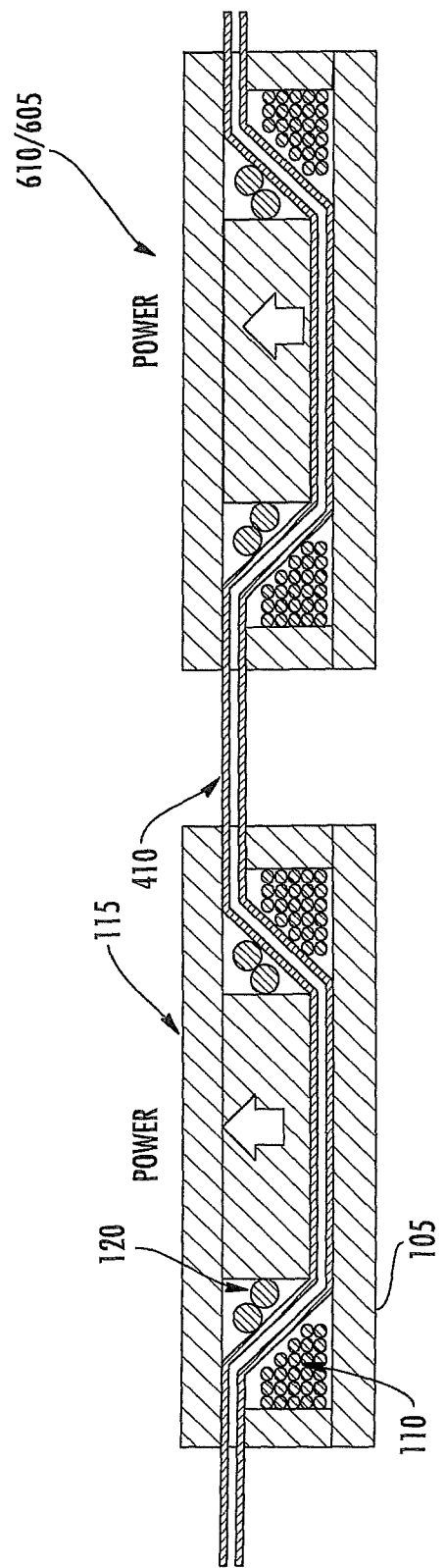

It will be understood that as shown in FIG. 6D, once the primary and secondary are moved to within the separation distance defined by the enclosures, wireless power transfer can be provided by the plurality of primary and secondary magnetic cores/coils in unison with one another. Accordingly, additional power requirements may be met by providing wireless power transfer using a plurality of the apparatuses 100 in combination with one another. For example, in some embodiments according to the invention, the wireless power transferred to the secondary magnetic core/coil can be combined by the wireless receiver portion to provide relatively high voltage to the load. In still other embodiments according to the invention, the wireless power transfer provided to the wireless power receiver portion can be provided separately to each of the dc power busses shown, for example, in FIG. 5.

As described herein, in some embodiments according to the invention, inductive wireless power transfer can be provided by a primary magnetic core that is shaped to provide a recess in which the primary coil is wound. A secondary magnetic core can be shaped to have a center protruding portion around which a secondary coil is wound. Inductive wireless power transfer can be provided by moving the protruding portion of the secondary magnetic core/coil into the recess of the primary magnetic core/coil. Insertion of the protruding portion into the recess can increase overlap between the primary core and the secondary coil which may generate additional magnetic flux coupling between the primary and secondary thereby allowing greater efficiency in wireless power transfer.

In some embodiments according to the invention, when the secondary magnetic core/coil is inserted into the recess, the primary magnetic core/coil remains separated from the secondary magnetic core/coil by, for example an air gap. In some embodiments according to the invention, the primary magnetic core/coil and/or the secondary magnetic core/coil can be in a respective enclosure which can also provide the separation of the primary and secondary despite contact being made to the enclosure. In some embodiments according to the invention, the enclosures can be a high permeability material or otherwise infused with a high permeability material.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A power supply comprising:
a receiver portion of a wireless power transfer apparatus, the receiver portion located in an electrical equipment rack and configured to be vertically positioned above a transmitter portion of the wireless power transfer apparatus, wherein the transmitter portion is outside the electrical equipment rack and is separated from the receiver portion during wireless power transfer from the transmitter portion to the receiver portion, wherein the receiver portion of the wireless power transfer apparatus includes:
a secondary magnetic core including a protruding center portion and a secondary coil wound around the protruding center portion of the secondary magnetic core, wherein the secondary magnetic core and secondary magnetic coil is configured for insertion into a center of a recess of a primary magnetic core so that the protruding center portion overlaps a primary magnetic core side wall and is configured to provide separation between the primary magnetic core and the secondary magnetic core.

2. The power supply of claim 1 wherein the power supply is configured to mount in an electrical equipment rack, the electrical equipment rack comprising:
a structure configured to removably mount a plurality of separately powered electrical components in the electrical equipment rack in a vertical arrangement;
a plurality of DC power busses extending vertically in the electrical equipment rack to provide DC power to each of the plurality of separately powered electrical components; and
wherein the receiver portion of the wireless power transfer apparatus is configured to be vertically positioned above a transmitter portion of the wireless power transfer apparatus that is outside the electrical equipment rack and separated from the receiver portion during wireless power transfer from the transmitter portion to the receiver portion.

3. The power supply of claim 1 wherein the receiver portion is configured to move from an inactive position toward the transmitter portion to an active position used during the wireless power transfer, the active position separating the transmitter portion from the receiver portion by a gap.

4. The power supply of claim 3 wherein the gap comprises about 1 mm to about 5 mm.

5. The power supply of claim 1 wherein the transmitter portion is configured to move from an inactive position toward the receiver portion to an active position used during the wireless power transfer, the active position separating the transmitter portion from the receiver portion by a gap.

6. A wireless power transfer apparatus comprising:
a plurality of wireless power transfer receiver coils, coupled together in a moveable receiver portion of the wireless power transfer apparatus, each of the plurality of wireless power transfer receiver coils being configured to wirelessly receive a transfer of power from a wireless power transfer transmitter outside the apparatus;

wherein the wireless power transfer apparatus further comprises a plurality of receiver magnetic cores, each including a protruding center portion that is surrounded by a respective one of the plurality of the wireless power transfer receiver coils; and wherein each of the plurality of receiver magnetic cores is configured for insertion into a respective recess to overlap a side wall of a respective transmitter magnetic core and to provide separation between the respective transmitter magnetic core and the protruding center portion.

7. The wireless power transfer apparatus of claim 6 wherein the moveable receiver portion of the wireless power transfer apparatus is installed in a server rack directly opposite a floor of a data center.

8. The wireless power transfer apparatus of claim 6 wherein wireless power transfer apparatus as part of a power supply is configured to mount in an electrical equipment rack, wherein the electrical equipment rack comprising:

a structure configured to removeably mount a plurality of separately powered electrical components in the electrical equipment rack in a vertical arrangement;

a plurality of DC power busses extending vertically in the electrical equipment rack to provide DC power to each of the plurality of separately powered electrical components; and wherein the plurality of wireless power transfer receiver coils are configured to be vertically positioned above a transmitter portion of the wireless power transfer apparatus that is outside the electrical equipment rack and is separated from the plurality of wireless power transfer receiver coils during wireless power transfer.

9. The wireless power transfer apparatus of claim 8 wherein the plurality of wireless power transfer receiver coils are configured to move from an inactive position toward the transmitter portion to an active position used during the wireless power transfer, the active position separating the transmitter portion from the plurality of wireless power transfer receiver coils by a gap.

10. The wireless power transfer apparatus of claim 9 wherein the gap comprises about 1 mm to about 5 mm.

11. The wireless power transfer apparatus of claim 8 wherein the transmitter portion is configured to move from an inactive position toward the plurality of wireless power transfer receiver coils to an active position used during the wireless power transfer, the active position separating the transmitter portion from the plurality of wireless power transfer receiver coils by a gap.

12. A wireless power transfer apparatus comprising:

a plurality of wireless power transfer receiver coils, coupled together in a moveable receiver portion of the wireless power transfer apparatus, each of the plurality of wireless power transfer receiver coils being configured to wirelessly receive a transfer of power from a wireless power transfer transmitter outside the apparatus;

wherein the wireless power transfer apparatus further comprises a plurality of receiver magnetic cores, each including a protruding center portion that is surrounded by a respective one of the plurality of the wireless power transfer receiver coils;

wherein the protruding center portion of each of the plurality of the receiver magnetic cores is configured to insert into a recess of a respective transmitter magnetic core in the wireless power transfer transmitter; and wherein each of the plurality of wireless power transfer receiver coils is configured to overlap with the respective transmitter magnetic core via the insertion of the protruding center portion.

13. The wireless power transfer apparatus of claim 12 wherein each of the plurality of wireless power transfer receiver coils and the respective one of the plurality of receiver magnetic cores are enclosed in a separator structure for separation from the respective transmitter magnetic core.

* * * * *

UNITED STATES PATENT AND TRADEMARK OFFICE
CERTIFICATE OF CORRECTION

PATENT NO. : 10,978,244 B2
APPLICATION NO. : 15/969019
DATED : April 13, 2021
INVENTOR(S) : Jun Xu et al.

Page 1 of 1

It is certified that error appears in the above-identified patent and that said Letters Patent is hereby corrected as shown below:

On the Title Page

(73) Assignee: Please correct "Eaton Intelligent Power Limited" to read -- Eaton Intelligent Power Limited (SE) --

(56) References Cited, Page 2, Column 1, Line 50: Please correct "2012/6293118 11/2012 Kim et al." to read -- 2012/0293118 11/2012 Kim et al. --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*